United States Patent
Kurz et al.

(10) Patent No.: US 11,565,290 B2
(45) Date of Patent: Jan. 31, 2023

(54) DETERMINATION OF AN ADJUSTMENT OF A ROLL STAND

(71) Applicant: Primetals Technologies Germany GmbH, Erlangen (DE)

(72) Inventors: Matthias Kurz, Erlangen (DE); Klaus Loehe, Fürth (DE)

(73) Assignee: Primetals Technologies Germany GmbH, Erlangen (DE)

( * ) Notice: Subject to any disclaimer, the term of this patent is extended or adjusted under 35 U.S.C. 154(b) by 0 days.

(21) Appl. No.: 17/598,335

(22) PCT Filed: Feb. 27, 2020

(86) PCT No.: PCT/EP2020/055106
§ 371 (c)(1),
(2) Date: Sep. 27, 2021

(87) PCT Pub. No.: WO2020/193051
PCT Pub. Date: Oct. 1, 2020

(65) Prior Publication Data
US 2022/0088656 A1 Mar. 24, 2022

(30) Foreign Application Priority Data
Mar. 28, 2019 (EP) .................................. 19165689

(51) Int. Cl.
*G01B 7/14* (2006.01)
*G05B 13/02* (2006.01)
*B21B 13/02* (2006.01)

(52) U.S. Cl.
CPC ................ *B21B 13/02* (2013.01); *G01B 7/14* (2013.01); *G05B 13/021* (2013.01)

(58) Field of Classification Search
CPC ....................................................... B21B 13/02
See application file for complete search history.

(56) References Cited

U.S. PATENT DOCUMENTS

| 5,511,303 A | 4/1996 | Tippins et al. |
| 5,771,732 A * | 6/1998 | Kramer .................. B21B 37/74 72/8.5 |

(Continued)

FOREIGN PATENT DOCUMENTS

| DE | 102004041328 A1 | 3/2006 |
| EP | 0584605 A1 | 3/1994 |

(Continued)

OTHER PUBLICATIONS

International Search Report and Written Opinion received in International Application No. PCT/EP2020/055106 dated May 8, 2020, 15 pages.

(Continued)

*Primary Examiner* — Jennifer L Norton
(74) *Attorney, Agent, or Firm* — Liang & Hennessey LLP; Brian Hennessey

(57) ABSTRACT

Slabs pass through a furnace in a conveying direction, are heated to rolling temperature, and are rolled in at least one roller stand. Determining device receives information showing the regions occupied by the slabs relative to one another when passing through the furnace in at least one direction orthogonal to the conveying direction, and determines, for at least one rolling pass of the respective slab, an adjustment of the roller stand performing this rolling pass without prior determination of a respective temperature distribution of a respective slab or without utilization of a determined temperature of a respective slab. The determining device takes into account the region occupied by the respective preceding and/or following slab, seen in the conveying direction, relative to the respective slab, and supplies the respective determined adjustment of the roller stand to a control device, which controls the roller stand when the respective slab is being rolled.

13 Claims, 4 Drawing Sheets

(56) References Cited

U.S. PATENT DOCUMENTS

| | | | |
|---|---|---|---|
| 6,332,492 B1* | 12/2001 | Donini | B21B 39/12 |
| | | | 164/476 |
| 2004/0205951 A1* | 10/2004 | Kurz | C21D 11/005 |
| | | | 29/407.05 |
| 2010/0219567 A1* | 9/2010 | Imanari | C21D 9/573 |
| | | | 266/90 |
| 2011/0239722 A1* | 10/2011 | Gruss | B21B 37/46 |
| | | | 700/151 |
| 2012/0096914 A1* | 4/2012 | Seidel | B21B 39/14 |
| | | | 72/203 |
| 2015/0034268 A1* | 2/2015 | Seidel | B22D 11/1284 |
| | | | 164/462 |
| 2018/0202719 A1* | 7/2018 | Vesel, Jr. | F27D 19/00 |
| 2019/0255602 A1* | 8/2019 | Hoevelmann | B22D 11/147 |
| 2021/0205917 A1* | 7/2021 | Schellmann | B23K 20/16 |

FOREIGN PATENT DOCUMENTS

| | | | |
|---|---|---|---|
| EP | 0919296 A1 | | 6/1999 |
| EP | 4005693 A1 | * | 6/2022 |
| WO | 2012159849 A1 | | 11/2012 |

OTHER PUBLICATIONS

European Search Report received in European Application No. 19165689.1 dated Sep. 3, 2019, 6 pages.
Jaklic et al., "Online simulation model of the slab-reheating process in a pusher-type furnace" Applied Thermal Engineering, 27 (5-6), p. 1105 to 1114, Apr. 2007; 2007, 3 pages.
P Marino et al., "Control of Pusher Furnaces for Steel Slab Reheating Using A Numerical Model" Latin American Applied Research, Bd. 34, p. 249 to 255 (2004); 2004; 7 pages.

\* cited by examiner

DETERMINATION OF AN ADJUSTMENT OF A ROLL STAND

CROSS-REFERENCE TO RELATED APPLICATIONS

The present application is a national phase application of PCT Application No. PCT/EP2020/055106, filed Feb. 27, 2020, entitled "DETERMINATION OF AN ADJUSTMENT OF A ROLL STAND", which claims the benefit of European Patent Application No. 19165689.1, filed Mar. 28, 2019, each of which is incorporated by reference in its entirety.

BACKGROUND OF THE INVENTION

1. Field of the Invention

For a roller stand to which a slab is fed for the purpose of rolling, the present invention relates to the determination of an adjustment of the roller stand.

2. Description of the Related Art

Slabs are hot-rolled in roller stands. When the respective slab is running out of the roller stand, cambers or hooks may form. A camber or hook occurs when the slab in the roller stand is rolled more strongly on one side than on the other side of said slab.

Both a camber and a hook are disadvantageous and should therefore be avoided if possible. If the reasons for which a camber or a hook occurs are known, the formation of cambers and/or hooks can be suppressed and/or at least positively influenced (generally reduced) by correcting the adjustment of the roller stand—in particular by asymmetrically setting the roller gap.

The formation of cambers or hooks can occur as early as during the first rolling pass of the slab, i.e. the first rolling pass to which the slab is subjected after leaving a furnace which heats the slab to rolling temperature.

WO 2012/159,849 A1 discloses that in particular a temperature taper influences the formation of cambers or hooks. It is also mentioned that an asymmetrical adjustment of a roller stand can be determined depending on the temperature taper and/or a corresponding strength taper. However, WO 2012/159,849 A1 does not disclose how such a temperature taper could be determined. However, it is known that a local temperature taper is intensified in the overlap-free region of two slabs which are adjacent in the furnace.

The technical paper "Control of Pusher Furnaces for Steel Slab Reheating Using A Numerical Model" by P. Marino et al., published in Latin American Applied Research, vol. 34, pages 249 to 255 (2004), discloses a model-based method by means of which the temperature of a slab can be determined as a function over the length of the slab. This document expressly does not consider a dependency of the temperature over the width.

The technical paper "Online simulation model of the slab-reheating process in a pusher-type furnace" by Anton Jaklic et al., Applied Thermal Engineering, 27 (5-6), pages 1105 to 1114, April 2007, discloses the online determination of the three-dimensional heat distribution of a slab in a pusher furnace by means of a simulation model.

In a similar way, it is also possible that, during the rolling of the slab, the contour with which the slab runs out of the roller stand performing the respective rolling pass changes. One possible cause for this is that the two sides of a slab are heated by the furnace in their head region and/or in their foot region differently than in their central region between the head and foot. It is also the case that such contour changes are disadvantageous and should be avoided if possible.

SUMMARY OF THE INVENTION

It is possible to determine the temperature distribution in the slab by means of a model and then to utilize the determined temperature distribution in the course of the determination of the adjustment of the roller stand. For this, the model by means of which the temperature distribution is determined has to be implemented explicitly. Furthermore, the model has to be implemented in such a way that by means of the model an online determination of the temperature distribution is possible. This is associated with considerable outlay and considerable difficulties and also has a high processing intensity.

The object of the present invention is to provide options by means of which the formation of cambers or hooks when a slab is being rolled can be reliably avoided or at least reduced in a simple manner. In particular, in this respect it should not be necessary to implement a temperature model and to determine a temperature distribution in the slabs by means of the temperature model. If possible, a change in the contour of the slab should also be countered.

The object is achieved by a determination method having the features of the independent claims. Advantageous configurations of this determination method are the subject matter of the dependent claims.

According to the invention, a method for determining an adjustment of at least one roller stand when slabs are being rolled in at least one rolling pass is provided, wherein the slabs pass through a furnace in a conveying direction such that there is a respective plurality of slabs in the furnace, wherein the slabs are heated to a final temperature while passing through the furnace, wherein a determining device receives information showing the regions occupied by the slabs relative to one another when passing through the furnace in at least one direction orthogonal to the conveying direction, wherein the determining device uses the information it has received to determine, for at least one rolling pass of the respective slab, the adjustment of the roller stand performing this rolling pass without prior determination of a respective temperature distribution of a respective slab or without utilization of a determined temperature distribution of a respective slab, wherein the determining device, when determining the adjustment for the respective slab, takes into account the region occupied by the respective preceding slab, seen in the conveying direction, relative to the respective slab and/or the region occupied by the respective following slab, seen in the conveying direction, relative to the respective slab, wherein the determining device supplies the respective determined adjustment of the roller stand to a control device, which controls the roller stand when the respective slab is being rolled, taking into account the respective adjustment.

The present invention is based firstly on the realization that the temperature distribution is ultimately not relevant for the operator of the roller stand. The operator merely has to know how to set the roller stand. It is therefore possible to "skip" the determination of the temperature distribution as such or not to utilize it. This makes it possible to considerably simplify the determination of the adjustment.

Furthermore, the present invention is based on the realization that, for the formation of a hook or camber, especially relevant is the extent to which adjacent slabs overlap or do not overlap, as viewed orthogonally to the conveying direction. The same applies, if appropriate, in the event that the contour of the slab changes as viewed in the longitudinal direction of the slab.

The overlap of the slabs will generally be determined in particular in the longitudinal direction of the slabs. In specific cases, however, it may also be expedient to determine the overlap of the slabs in the thickness direction of the slabs. If such a determination takes place in the thickness direction, it will generally be carried out in addition to determining the overlap of the slabs in the longitudinal direction of the slabs. In specific cases, however, it may also be carried out instead of determining the overlap of the slabs in the longitudinal direction of the slabs.

As a rule, after the first rolling pass, the respective slab is subjected to at least one further rolling pass. The at least one further rolling pass may—in the case of a reversing stand—be carried out in the roller stand performing the first rolling pass. As an alternative, the at least one further rolling pass—in the case of a multi-stand rolling train—may be carried out in at least one further roller stand. The determining device preferably determines the adjustment of the roller stand at least for the first rolling pass to which the respective slab is subjected after leaving the furnace. This makes it possible to counter the formation of cambers and/or hooks and, if appropriate, also a change in contour as early as during the first rolling pass, in which a preceding rolling has not yet taken place and accordingly also values from a preceding rolling pass are not yet available. However, it is similarly possible—in specific cases as an alternative, generally in addition—to determine an adjustment for the at least one further rolling pass.

The determining device preferably additionally receives information showing the spacing between slabs which are adjacent in the conveying direction when passing through the furnace in the conveying direction, and takes into account the spacing between the slabs which are adjacent in the conveying direction when determining the adjustment of the roller stand performing this rolling pass.

This procedure is advantageous in particular in the case of a walking beam furnace, since in a walking beam furnace the slabs which are adjacent in the conveying direction are spaced apart from one another. This spacing is generally constant during the transport of the corresponding slabs through the furnace. However, it is not necessarily constant from one pair of mutually adjacent slabs to the next pair of mutually adjacent slabs. By contrast, in a pusher furnace, the adjacent slabs are generally in direct contact with one another (spacing=0).

The respective adjustment determined by the determining device is generally spatially resolved in the width direction of the respective slab. For example, the determining device can determine a pivot value for an asymmetric taper adjustment or a bending value for roller bending.

The determining device preferably determines the adjustment of the roller stand as a function over the location in the longitudinal direction of the respective slab or as a function of time. This makes it possible to better counter the formation of cambers and hooks. In order to be able to counter a change in contour, this is necessary.

The spatial resolution in the longitudinal direction of the respective slab may be determined as required. In the simplest case, for example, it is possible for a distinction to be made only between an adjustment for the rolling of the head of the slab and the rolling of the remaining part of the slab, or for the rolling of the foot of the slab and the rolling of the remaining part of the slab. It is also possible to make a distinction between an adjustment for the rolling of the head of the slab, the rolling of a middle part (fillet) of the slab, and the rolling of the foot of the slab. It is also possible to make a distinction between an adjustment for the rolling of the head of the slab, the rolling of a transition from the head of the slab to the fillet of the slab, the rolling of the fillet of the slab, the rolling of a transition from the fillet of the slab to the foot of the slab, and the rolling of the foot of the slab. Other spatial resolutions are also possible. Furthermore, it is possible to provide a continuous transition, for example in the form of a ramp, during the transition from the adjustment for one portion of the slab to the adjustment for the next portion of the slab. Analogous statements apply for the determination of the adjustment as a function of time.

The determining device preferably receives further parameters which describe the slabs as such and takes the further parameters into account when determining the adjustment of the roller stand performing this rolling pass. This makes it possible to counter the formation of cambers and/or hooks and/or changes in contour even better.

In particular, the width of the respective slab, the chemical composition thereof and, if appropriate, the temperature thereof when it is being fed to the furnace come into consideration as further parameters. The lengths and the thicknesses of the slabs are also important parameters. However, they are not conjointly listed at this point since they are already—directly or indirectly—included in the information establishing the regions occupied by the individual slabs relative to one another in the at least one direction orthogonal to the conveying direction.

The determining device preferably receives a furnace temperature and/or a dwell time of the slabs in the furnace and takes into account the furnace temperature and/or the dwell time of the slabs when determining the adjustment of the roller stand performing this rolling pass. This also makes it possible to counter the formation of cambers and/or hooks better.

The determining device preferably receives charging data of the furnace, which describe the charging of the furnace with the slabs, and takes into account the charging data of the furnace when determining the adjustment of the roller stand performing this rolling pass. The charging therefore indicates how the respective slab is arranged in the furnace when it is being fed to the furnace. It thus indicates the starting position of the slab in the furnace.

In the case of a walking beam furnace, for example, the charging data can indirectly determine the spacing between adjacent slabs in the conveying direction. Furthermore, the charging data can establish the arrangement of the slabs relative to one another in the longitudinal direction of the slabs and in this way, in conjunction with the lengths of the slabs, provide information about which regions the slabs occupy orthogonally to the conveying direction.

As an alternative, it is possible for the determining device to receive sensor-detected data which are characteristic of the regions occupied by each of the slabs in the furnace. Corresponding sensors are generally known to those skilled in the art. Purely by way of example, a camera, a laser sensor system and an ultrasonic sensor system should be mentioned. In the case of a sensor-based detection of data, the regions occupied by the slabs orthogonally to the conveying direction can be determined—if appropriate with additional utilization of the thickness of the slabs—on the basis of the sensor-detected data.

The adjustment may be determined in different ways. For example, it is possible for the determining device to determine the adjustment of the roller stand by means of a multi-dimensional linear regression, by means of a non-linear approximation through multi-dimensional polynomials or splines, or by means of a neural network.

The object is furthermore achieved by a computer program having the features of claim 10. According to the invention, the computer program comprises machine code which can be executed by a determining device, wherein the execution of the machine code by the determining device has the effect that the determining device carries out a determination method according to the invention.

The object is furthermore achieved by a determining device having the features of the claims. According to the invention, the determining device is programmed with a computer program according to the invention, so that the determining device carries out a determination method according to the invention during operation.

The object is furthermore achieved by a combination of a determining device according to the invention with a control device having the features of the claims. According to the invention, the control device and the determining device are connected to one another in terms of data technology, such that the determining device transmits the adjustments of the roller stand that it has determined to the control device. Furthermore, the control device controls the roller stand when the respective slab is being rolled. When the slabs are being rolled, the control device takes into account the adjustments of the roller stand that are transmitted to it.

The object is furthermore achieved by a rolling plant for rolling slabs having the features of the claims. According to the invention, the rolling plant has at least one furnace, through which the slabs pass in a conveying direction and by means of which the slabs can be heated to a final temperature. The furnace is dimensioned in such a way that, as viewed in the conveying direction, there is a plurality of slabs in the furnace at the same time. The rolling plant furthermore has at least one roller stand, to which the slabs are fed for the purpose of rolling. Finally, the rolling plant has a combination according to the invention (see above), wherein the at least one roller stand is controlled by the control device of the combination.

BRIEF DESCRIPTION OF THE DRAWINGS

The characteristics, features and advantages of this invention that are described above and the manner in which they are achieved become clearer and more distinctly comprehensible in connection with the following description of the exemplary embodiments, which are explained in more detail in conjunction with the drawings, in which, in a schematic depiction.

DETAILED DESCRIPTION

Figure 1:
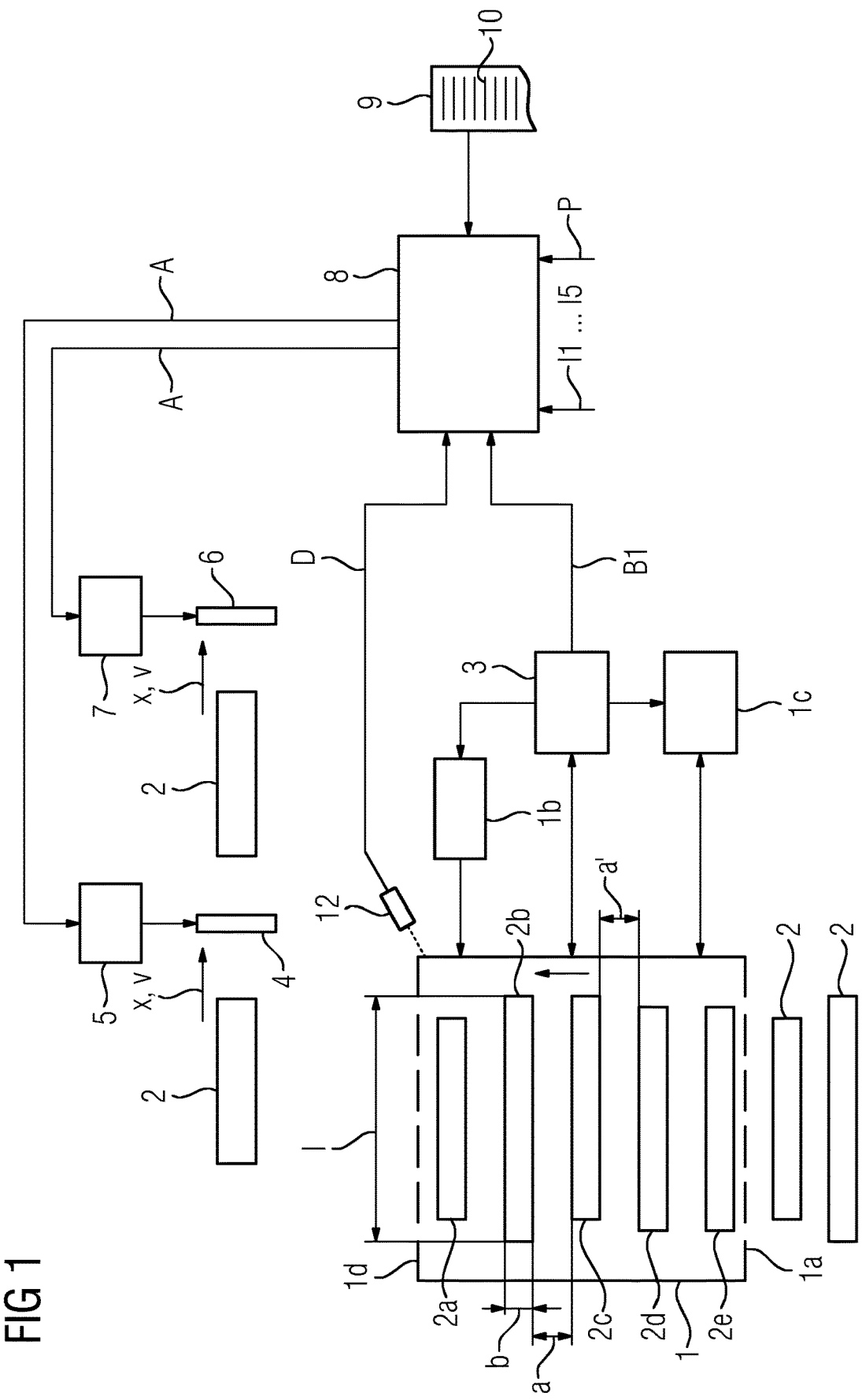
FIG. 1 shows a rolling plant.

According to FIG. 1, a rolling plant has at least one furnace 1. The furnace 1 may be in the form, for example, of a pusher furnace or a walking beam furnace. It is dimensioned in accordance with the illustration in FIG. 1 in such a way that, as viewed in a conveying direction y, a plurality of slabs 2 are in the furnace at the same time. The slabs 2 therefore each have a preceding slab 2 and a following slab 2, as viewed in the conveying direction y. The illustration in FIG. 1, in which there are a total of five slabs 2 in the furnace 1, is, however, only purely by way of example.

The slabs 2 are fed sequentially one after another to the furnace 1 at a furnace entrance 1a and transported through the furnace 1 in the conveying direction y by means of a corresponding conveying device 1b. The slabs 2 are supplemented in FIG. 1 by a lowercase letter a, b, etc. corresponding to the order in which they are fed to the furnace 1. During the transport through the furnace 1, the slabs 2 are heated to their rolling temperature by means of a corresponding heating device 1c. After the heating, the slabs 2 are conveyed out of the furnace 1 at a furnace exit 1d. The furnace entrance 1a, the conveying device 1b, the heating device 1c and the furnace exit 1d are constituent parts of the furnace 1.

The slabs 2 generally consist of steel. As an alternative, they may consist of another metal, for example aluminum. The slabs 2, as illustrated in FIG. 1 by way of example for one of the slabs 2, each have a length 1 and a width b. They furthermore also have a thickness d. However, the thickness d cannot be seen in FIG. 1 or in the other figures. The length 1 is usually in the range of between 10 m and 25 m. The width b is usually in the range of between 50 cm and 3.0 m. The thickness d is usually in the range of between 50 mm and 300 mm Both the length 1 and the width b as well as the thickness d may differ from slab 2 to slab 2. The rolling temperature—i.e. the temperature at which the rolling begins after the respective slab 2 has been conveyed out of the furnace 1—is generally between 950° C. and 1200° C. for steel, and correspondingly higher or lower for other metals. A final temperature at which the slabs 2 exit the furnace 1 is accordingly at or slightly above the rolling temperature. The furnace 1 is controlled by a control device 3, which is referred to below as furnace controller 3.

After the respective slab 2 has been conveyed out of the furnace 1, the respective slab 2 is fed to a roller stand 4. The roller stand 4 is referred to below if necessary as the first roller stand 4, because it is that roller stand which carries out the first rolling pass after the respective slab 2 has been conveyed out of the furnace 1. The respective slab 2 is thus rolled in the roller stand 4. The roller stand 4 is controlled by a control device 5, which is referred to below if necessary as the first stand controller 5. The controlling of the first roller stand 4 by the first stand controller 5 is effected, among other things, even when the respective slab 2 is rolled in the first roller stand 4.

In addition to the first roller stand 4, further roller stands 6 are often present. The further roller stands 6 are controlled by a respective control device 7, which is referred to below if necessary as further stand controllers 7. Only one of the further roller stands 6 is illustrated in FIG. 1. The same applies to the further stand controllers 7. Whether and, if appropriate, how many further roller stands 6 are present may vary from case to case. As required, the stand controllers 5, 7 may be in the form of separate units or assembled to form a common unit. The slabs 2 are rolled in the first roller stand 4 and also in the further roller stands 6 in a rolling direction x at a rolling velocity v. The rolling direction x is generally the same for all roller stands 4, 6. The rolling velocity v generally differs from roller stand 4, 6 to roller stand 4, 6.

If the slabs 2 are rolled reversibly in the first roller stand 4 and/or the further roller stands 6, the slabs 2 are also rolled in the roller stands 4, 6 counter to the rolling direction denoted by x in FIG. 1. Often, for example, the slabs 2 are firstly pre-rolled reversibly in a plurality of passes in the first roller stand 4 and then finish-rolled in the further roller stands 6 in a respective pass per further roller stand 6. As a rule, the rolling direction x is orthogonal to the conveying direction y and runs in the longitudinal direction of the slabs 2.

For the sake of good order, it should be mentioned that the illustration in FIG. 1 is purely schematic. In particular, spacings and spacing relationships are not true to scale. For example, the first roller stand 4 often has a spacing from the further roller stands 6 which is considerably greater than the spacing of the further roller stands 6 from one another. The spacing between the individual further roller stands 6 is usually between 4 m and 7 m. The spacing from the first roller stand 4 to the next roller stand 6 is often 50 m or more. Before the rolling of the respective slab 2 in a further roller stand 6 begins, the slabs 2 are generally rolled reversibly in the first roller stand 4.

At least one of the stand controllers 5, 7 is connected in terms of data technology to a determining device 8. In particular, at least the first stand controller 5 is generally connected in terms of data technology to the determining device 8. Owing to the data-technology connection, it is possible for the determining device 8 to transmit adjustments A of the corresponding roller stand 4, 6 that it has determined for a corresponding rolling pass of a respective slab 2 to the corresponding stand controller 5, 7. When the respective slab 2 is being rolled, the respective stand controller 5, 7 takes into account the respective adjustment A that is transmitted to it.

The determining device 8 is programmed with a computer program 9 in order to be able to determine the adjustments A. The computer program 9 comprises machine code 10, which can be executed by the determining device 8. The execution of the machine code 10 by the determining device 8 has the effect that the determining device 8 carries out a determination method which is explained in more detail below purely by way of example for the slab 2c. Analogous statements apply to the other slabs 2.

Figure 2:
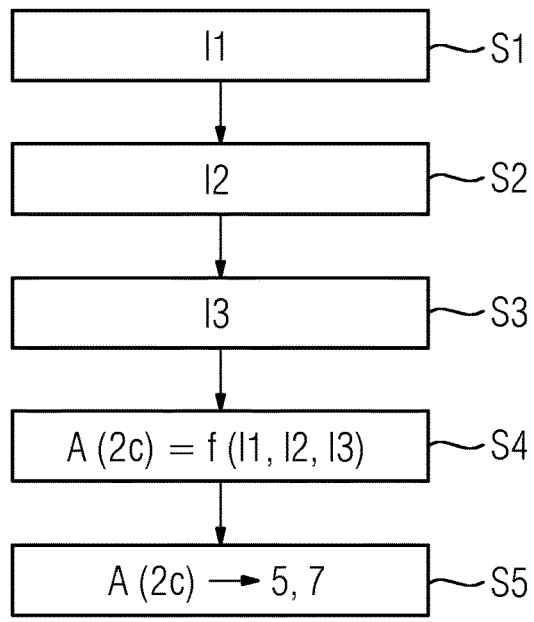
FIGS. 2 to 5 show flow diagrams.

According to FIG. 2, in a step S1 the determining device 8 receives for a specific slab 2—according to the example, that is to say the slab 2c—information I1 showing the region occupied by this slab 2c in at least one direction x, z orthogonal to the conveying direction y. Here, x denotes the longitudinal direction of the slab 2c, and z denotes the thickness direction. For example, the point at which the respective slab 2c begins and how long it is or where it ends, as viewed in the longitudinal direction x, may be specified to the determining device 8. As an alternative or in addition, the thickness of the slab 2c may be specified to the determining device 8.

Then, in a step S2 the determining device 8 receives for the preceding slab 2—according to the example, that is to say the slab 2b—information I2 showing the region occupied by this slab 2b in the at least one direction x, z orthogonal to the conveying direction y. The information I2 may in particular be of the same type as the information I1. However, the specific values are individual to the slab 2b.

Then, in a step S3 the determining device 8 receives for the following slab 2—according to the example, that is to say the slab 2d—information I3 showing the region occupied by this slab 2d in the at least one direction x, z orthogonal to the conveying direction y. The information I3 may also be of the same type as the information I1. The specific values are, however, again individual to the slab 2d here, too.

In a step S4, the determining device 8 uses the information I1, I2, I3 it has received to determine, for at least one rolling pass of the slab 2c, the adjustment A of the roller stand 4, 6 performing this rolling pass. In step S4, the adjustment A is determined without prior determination of a temperature distribution of the slab 2c. However, when determining the adjustment A of the slab 2c, the determining device 8 takes into account the region occupied by the slab 2b relative to the slab 2c. As an alternative or in addition, the determining device 8 takes into account the region occupied by the slab 2d relative to the slab 2c. In a step S5, the determining device 8 supplies the determined adjustment A to the control device 5, 7 of that roller stand 4, 6 performing this rolling pass.

Purely theoretically, a temperature distribution for the respective slab 2 could of course also be determined. If this takes place, however, the determined temperature distribution is not taken into account and/or utilized in the context of determining the adjustment A.

In order to be able to determine the respective adjustment A without prior determination of the temperature distribution, that adjustment A (output variable) which is required at which overlap of the respective slab 2c with the preceding and/or the following slab 2b, 2d (input variables) in order to roll the respective slab 2c as desired—for example to avoid a camber and/or a hook or to compensate for a change in contour that would otherwise take place—must in particular be made known to the determining device 8. This relationship may be determined, for example, by means of an offline evaluation of data, the data being detected over a longer period of time. As an alternative or in addition, the relationship may be determined by means of a suitable learning algorithm—if appropriate also online. It is generally known to perform a detection, for example of a hook which is forming and/or a camber which is forming, of a contour or a profile, which is required for the learning process in this case.

For example, it is possible that the determining device 8 determines the adjustment A of the roller stand 4 and/or of the roller stand 6 for the purpose of rolling the slab 2c by means of a multi-dimensional linear regression. Input variables of the regression may be, for example, a—positive or negative—projection of the head and/or the foot of the slab 2c beyond the preceding slab 2b and, in an analogous manner, a—positive or negative—projection of the head and/or the foot of the slab 2c beyond the following slab 2d. The thicknesses d of the slabs 2c, 2b, 2d may also be received in a similar manner. As an alternative, a determination by means of a non-linear approximation through multi-dimensional polynomials or splines is possible. The input variables of the non-linear approximation may be the same as those of the regression. In turn, a determination by means of a neural network is alternatively possible. The output variable is in each case the respective adjustment A of the respective roller stand 4, 6 for the purpose of rolling the slab 2c in the respective rolling pass.

Owing to the fact that the stand controllers 5, 7 take into account the transmitted adjustment A when the respective slab 2c is being rolled, the boundary condition arises that the determining device 8 has to perform the procedure of FIG. 2 online and in real time. In particular, the determination of the adjustment A has to be performed and completed at the latest when the respective slab 2c is being conveyed out of the furnace 1.

Figure 3:
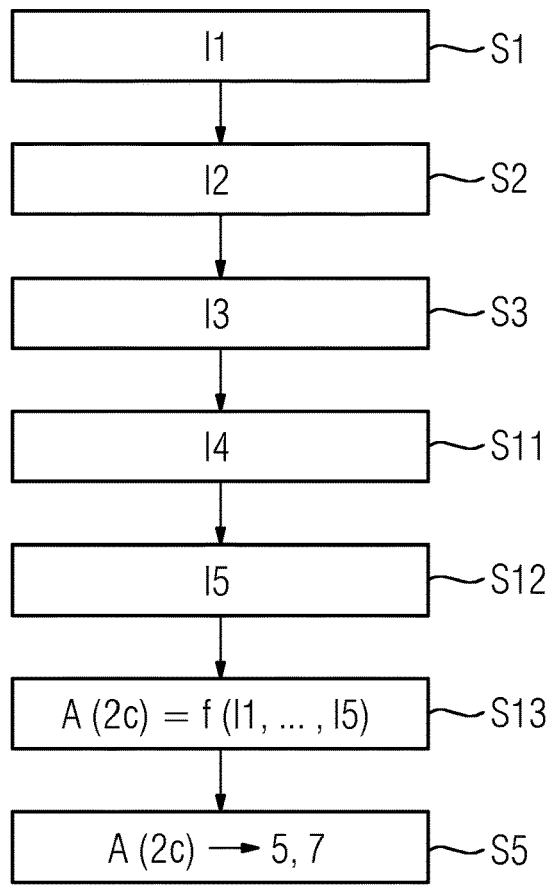

FIG. 3 shows a configuration of FIG. 2. In the context of the configuration of FIG. 3, steps S11 and S12 are additionally present. Furthermore, step S4 has been replaced by a step S13.

In step S11, the determining device 8 additionally receives information I4 showing the spacing a between the slab 2b and the slab 2c, as viewed in the conveying direction y. In an analogous manner, in step S12 the determining device 8 receives information I5 showing the spacing a' between the slab 2d and the slab 2c, as viewed in the conveying direction y. Step S12 is generally present in addition to step S11. In specific cases, an alternative to step S11 may be present. In step S13 the determining device 8 determines—on the basis of the adjustment as before in step S4—the adjustment A for the respective rolling pass. However, it additionally takes into account the spacings a, a' or at least one of the spacings a, a'. The learning of the necessary relationships may—as before—be determined by means of an offline or online evaluation of data, wherein the data are detected over a longer period of time.

The procedure of FIG. 2 may also be supplemented by further configurations, it being possible if required also to combine these configurations with one another and with the configuration of FIG. 3.

Figure 4:
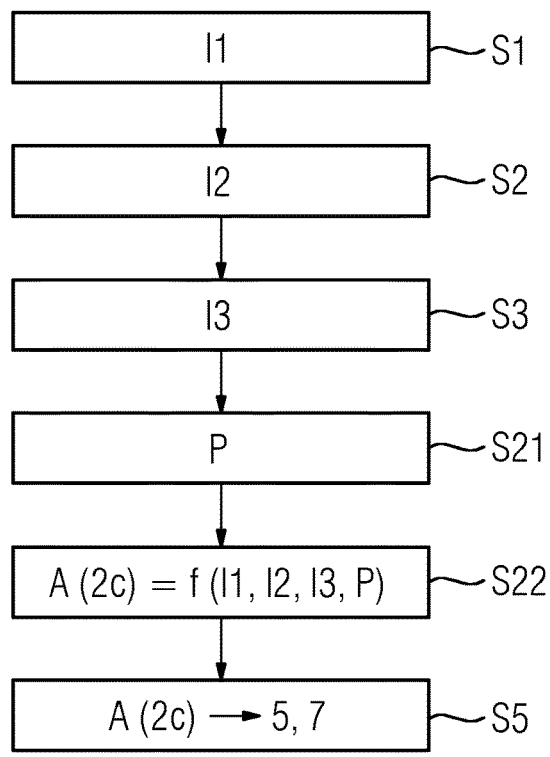

For example, in accordance with the illustration in FIG. 4, it is possible for the determining device 8 in an additional step S21 to receive further parameters P which describe the respective slab 2c as such. Examples of such parameters P are in particular the width b of the respective slab 2c, the chemical composition C thereof and a starting temperature T0, at which the respective slab 2c is fed to the furnace 1. In this case, step S4 is replaced by a step S22, in which the determining device 8 also takes into account the parameters P when determining the adjustment A—in addition to the measures of step S4. If necessary, the determining device 8 may also take into account corresponding parameters P of the preceding slab 2b and the following slab 2d when determining the adjustment A.

Figure 5:
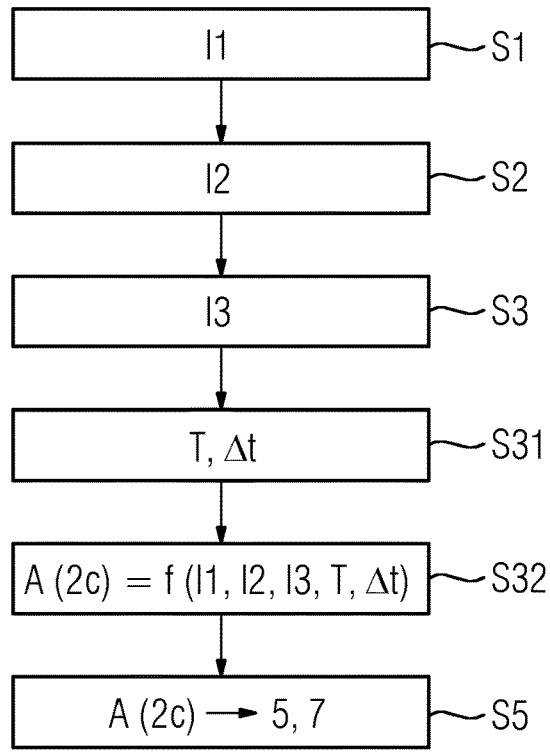

In accordance with the illustration in FIG. 5, it is also possible for the determining device 8 in an additional step S31 to receive a furnace temperature T and/or a dwell time Δt of the slabs 2 in the furnace 1. In this case, step S4 is replaced by a step S32, in which the determining device 8 also takes into account the furnace temperature T and/or the dwell time Δt when determining the adjustment A—in addition to the measures of step S4.

The adjustment A may be an absolute value ("the roller stand 4, 6 should be set to this adjustment") or a relative value ("the adjustment of the roller stand 4, 6 should be changed by this value with respect to the adjustment for the slab 2 to be pre-rolled"). In both cases, however, the adjustment A determined by the determining device 8 is generally spatially resolved in the width direction of the respective slab 2. In particular, the determined adjustment A may define a taper adjustment δs (that is to say an asymmetrical setting of the roller gap) and/or a roller bending B.

Figure 6:
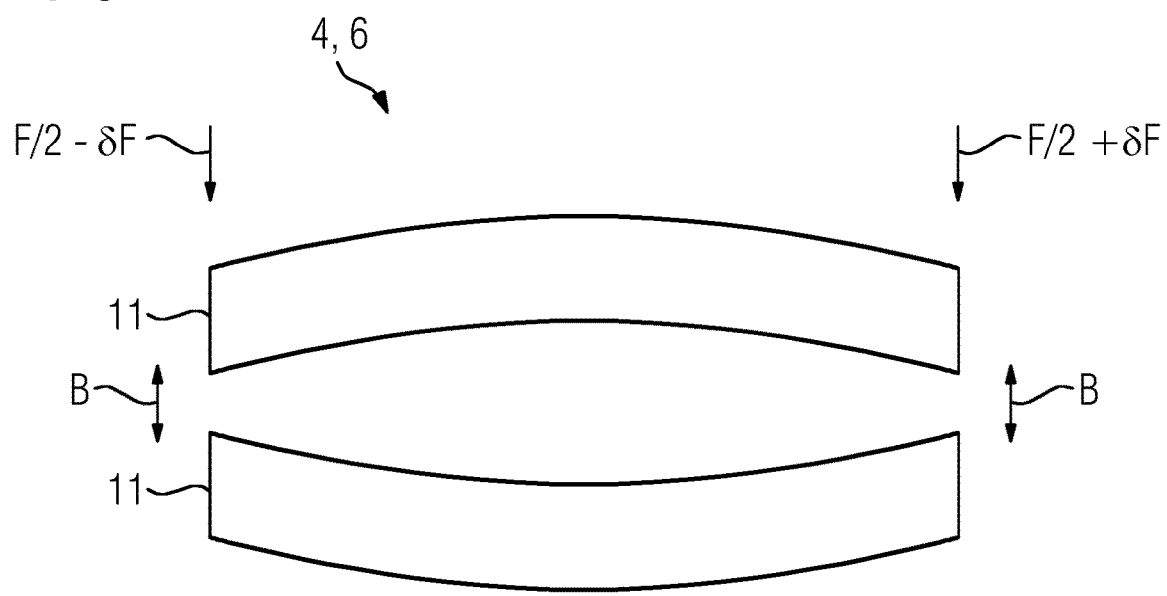
FIGS. 6 and 7 show a roller stand, as viewed in the rolling direction.
Figure 7:
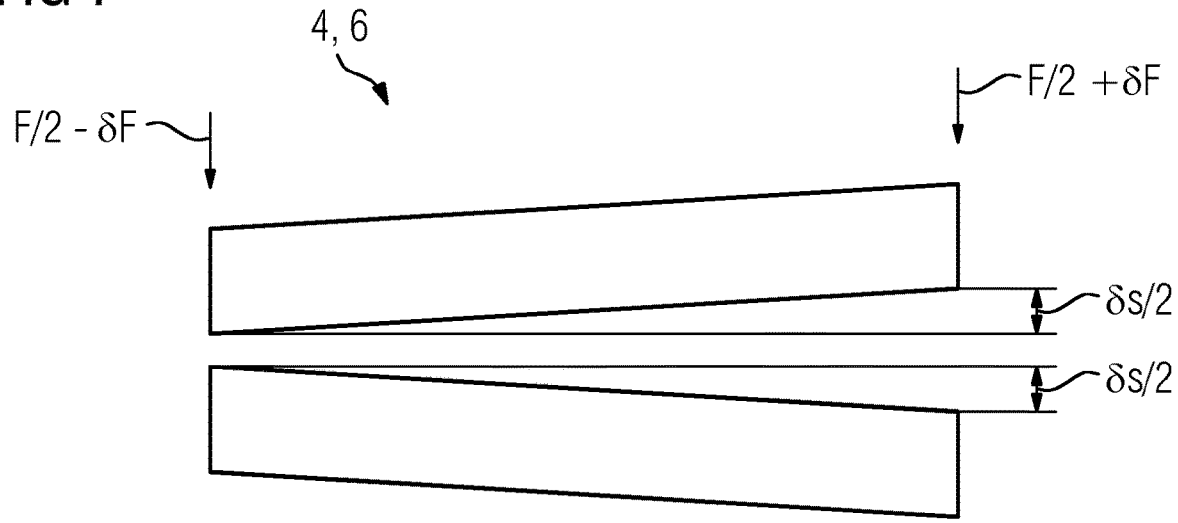

In order to convert the determined adjustment A into manipulated variables for the roller stands 4, 6, the stand controllers 5, 7 can use the adjustment A to determine a roller bending B, a taper adjustment δs, a total rolling force F and a differential rolling force δF. In accordance with the illustration in FIG. 6, the roller bending B describes an extent to which working rollers 11 of the respective roller stand 4, 6 are symmetrically bent. In accordance with the illustration in FIG. 7, the taper adjustment δs describes an extent to which the working rollers 11 of the respective roller stand 4, 6 are asymmetrically set. In accordance with the illustration in FIGS. 6 and 7, the total rolling force F is distributed uniformly over the operating side and the driving side of the respective roller stand 4, 6, and the differential rolling force δF is supplied to one side with a positive sign and to one side with a negative sign. The procedures of FIGS. 6 and 7 may be combined with one another. They are illustrated separately in FIGS. 6 and 7 only for reasons of better illustration. With regard to the determination of the manipulated variables on the basis of the adjustment A as such, reference can be made to the already-mentioned document WO 2012/159,849 A1.

As an alternative or in addition, further actuators may also be correspondingly influenced, for example roller displacement means or roller interlacing means or local means for cooling and/or heating, seen in the width direction of the respective roller stand 4, 6, the working rollers 11 of the respective roller stand 4, 6 or means for influencing the temperature of the respective slab 2c shortly before or shortly after the corresponding roller stand 4, 6, for example by segmented cooling or by heating the edges.

The determining device 8 preferably determines the adjustment A of the roller stand 4, 6 as a function over the location in the longitudinal direction of the respective slab 2c or as a function of time. In this case, the stand controllers 5, 7 are able to correspondingly take into account the adjustment A of the corresponding roller stand 4, 6 that is transmitted to them. Fundamentally, the same variables as explained above in connection with FIGS. 6 and 7 may be determined. The difference, however, is that the determined adjustment A is now spatially resolved in the longitudinal direction of the respective slab 2. Since, furthermore, in accordance with the illustration in FIG. 1 the respective slab 2c is fed to the respective roller stand 4, 6 at a velocity v, the respective adjustment A of the respective roller stand 4, 6 may also be defined as a function of time. At a known velocity v, this is equivalent to a spatial resolution in the longitudinal direction of the respective slab 2c.

Various procedures are possible in order to specify the information I1, I2, I3 and if appropriate also I4, I5 and/or P to the determining device 8. For example, it is possible to implement steps S1 to S3 and if appropriate also S11, S12 and/or S21 in that the determining device 8 receives charging data B1 of the furnace 1, which describe the charging of the furnace 1 with the slabs 2. In this case, at least the respective region orthogonal to the conveying direction y that is occupied by the slabs 2 results from the charging data B1. For example, the charging data B1 may indicate whether the respective slab 2 is fed to the furnace 1 flush on the left, flush on the right, or in the middle, as viewed transversely to the conveying direction. If appropriate, the further details such as, for example, the widths b of the slabs 2, the chemical composition C thereof, the starting temperatures T0 thereof and the spacings a, a' thereof from one another in the conveying direction y may also be obtained from the charging data B1. As an alternative, in accordance with the illustration in FIG. 1 it is possible for there to be a sensor 12, which detects data D and supplies the data D to the determining device 8. In this case, the determining device 8 may determine the corresponding information I1, I2, I3 and if appropriate also I4, I5 on the basis of the data D. Suitable sensors 12 are generally known to those skilled in the art. Cameras, ultrasonic sensors and laser sensors should be mentioned purely by way of example.

The present invention has many advantages. In particular, it is possible to counter the formation of hooks or cambers as early as the first rolling pass of a slab 2 and also here from the beginning. Furthermore, when determining a profile for the adjustments A that is spatially resolved in the longitudinal direction of the slabs 2, it is possible to counter the formation of hooks and/or cambers and, if appropriate, also a change in contour very efficiently. The determination method may readily be integrated into the real-time operation of the furnace 1 and the roller stands 4, 6.

It is even possible to carry out the corresponding determinations in advance only purely computationally with a preliminary charging of the furnace 1 and then to vary the charging of the furnace 1 with the slabs 2 purely computationally with the aim of optimization. In this case, the later actual charging of the furnace 1 with the slabs 2 takes place corresponding to the values previously determined as optimal. For example, in the course of charging the order of the slabs 2 may be varied. The aim of the optimization may be, for example, the smallest possible taper adjustment δs of at least one rolling pass and/or an approximation of the roller bending B of the working rollers 11 to a target value for at least one rolling pass.

Furthermore, it is possible at any time to post-learn or adapt the method by means of which the determining device 8 determines the respective adjustment A. For this purpose, it is merely necessary to detect, for example, the resulting hook or camber and/or the change in contour on the outlet side of the respective roller stand 4, 6 by measuring instrumentation and to supply it to the learning algorithm.

Although the invention has been illustrated and described in more detail by the preferred exemplary embodiment, the invention is not limited by the examples disclosed, and other variations can be derived therefrom by a person skilled in the art without departing from the scope of protection of the invention.

LIST OF REFERENCE SIGNS

Furnace
1a Furnace entrance
1b Conveying device
1c Heating device
1d Furnace exit
2, 2a to 2e Slabs
Furnace controller
4, 6 Roller stands
5, 7 Stand controllers
Determining device
Computer program
Machine code
Working rollers
Sensor
A Adjustments
a, a' Spacings
B Roller bending
b Width
B1 Charging data
C Chemical composition
D Data
d Thickness
F Total rolling force
I1 to I5 Information
Length
P Parameters
S1 to S32 Steps
T Furnace temperature
T0 Starting temperature
x Rolling direction
y Conveying direction
z Thickness direction
δF Differential rolling force
δs Taper adjustment
Δt Dwell time

The invention claimed is:

1. A method for determining an adjustment of a roller stand when slabs are being rolled in at least one rolling pass, the slabs passing through a furnace in a conveying direction such that there are a plurality of slabs in the furnace, the slabs being heated to a final temperature while passing through the furnace, the method comprising:
receiving, by a determining device, information showing regions occupied by the slabs relative to one another when passing through the furnace in at least one direction orthogonal to the conveying direction; and
determining, by the determining device using the information, for at least one rolling pass of a respective slab of the plurality of slabs, the adjustment of the roller stand performing the at least one rolling pass without one of prior determination of a respective temperature distribution of the respective slab and utilization of a determined temperature of the respective slab;
wherein the determining device, when determining the adjustment of the roller stand for the respective slab, takes into account a first region occupied by a respective preceding slab, located in the conveying direction, relative to the respective slab and a second region occupied by a respective following slab, located in the conveying direction, relative to the respective slab; and
wherein the determining device supplies the adjustment of the roller stand for the respective slab to a control device, which controls the roller stand when the respective slab is being rolled, taking into account the adjustment.

2. The determination method as claimed in claim 1, wherein:
the determining device additionally receives information showing a spacing between slabs which are adjacent in the conveying direction when passing through the furnace in the conveying direction; and
the determining device takes into account the spacing between the slabs which are adjacent in the conveying direction when determining the adjustment of the roller stand.

3. The determination method as claimed in claim 1, wherein the adjustment varies over a width of the respective slab.

4. The determination method as claimed in claim 1, wherein the determining device determines the adjustment of the roller stand as a function over a location in a longitudinal direction of the respective slab or as a function of time.

5. The determination method as claimed in claim 1, wherein:
the determining device receives further parameters which describe the slabs; and
the determining device takes into account the further parameters when determining the adjustment of the roller stand.

6. The determination method as claimed in claim 1, wherein:
the determining device receives at least one of a furnace temperature and a dwell time of the slabs in the furnace; and
the determining device takes into account at least one of the furnace temperature and the dwell time of the slabs when determining the adjustment of the roller stand.

7. The determination method as claimed in claim 1, wherein:
- the determining device receives charging data of the furnace, which describe a charging of the furnace with the slabs; and
- the determining device takes into account the charging data of the furnace when determining the adjustment of the roller stand.

8. The determination method as claimed in claim 1, wherein the determining device receives sensor detected data which are characteristic of regions occupied by each of the slabs in the furnace.

9. The determination method as claimed in claim 1, wherein the determining device determines the adjustment of the roller stand by one of:
- a multi-dimensional linear regression;
- a non-linear approximation through one of multi-dimensional polynomials and splines; and
- a neural network.

10. A non-transitory computer-readable medium storing a computer program, the computer program comprising machine code which, when executed by a determining device, causes the determining device to perform a determination method for determining an adjustment of a roller stand when slabs are being rolled in at least one rolling pass, the slabs passing through a furnace in a conveying direction such that there are a plurality of slabs in the furnace, the slabs being heated to a final temperature while passing through the furnace, the method comprising:
- receiving, by the determining device, information showing regions occupied by the slabs relative to one another when passing through the furnace in at least one direction orthogonal to the conveying direction; and
- determining, by the determining device using the information, for at least one rolling pass of a respective slab of the plurality of slabs, the adjustment of the roller stand performing the at least one rolling pass without one of prior determination of a respective temperature distribution of the respective slab and utilization of a determined temperature of the respective slab;
- wherein the determining device, when determining the adjustment of the roller stand for the respective slab, takes into account a first region occupied by a respective preceding slab, located in the conveying direction, relative to at least one of the respective slabs and a second region occupied by a respective following slab, located in the conveying direction, relative to the respective slab; and
- wherein the determining device supplies the adjustment of the roller stand for the respective slab to a control device, which controls the roller stand when the respective slab is being rolled, taking into account the adjustment.

11. The determining device, wherein the determining device is programmed with the computer program as claimed in claim 10, such that the determining device carries out the determination method.

12. A combination of the determining device as claimed in claim 11 with the control device, wherein:
- the determining device and the control device are connected to one another, such that the determining device transmits the adjustment of the roller stand that it has determined to the control device;
- the control device controls the roller stand when the respective slab is being rolled; and
- when the slabs are being rolled, the control device takes into account the adjustment of the roller stand that is transmitted to it.

13. A rolling plant for rolling slabs, wherein:
- the rolling plant has at least one furnace, through which the slabs pass in a conveying direction and which heats the slabs to a final temperature;
- the furnace is dimensioned in such a way that, as viewed in the conveying direction, a plurality of slabs are in the furnace at the same time;
- the rolling plant furthermore has at least one roller stand, to which the slabs are fed for the purpose of rolling;
- the rolling plant has the combination as claimed in claim 12; and
- the roller stand is controlled by the control device of the combination.

* * * * *